US012595063B2

(12) United States Patent
　　　Raybern

(10) Patent No.:　US 12,595,063 B2
(45) Date of Patent:　　　Apr. 7, 2026

(54) SEAT CENTRAL CONTROL ARM WITH TENSIONING

(71) Applicant: Textron Innovations Inc., Providence, RI (US)

(72) Inventor: Blake David Raybern, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 446 days.

(21) Appl. No.: 18/362,815

(22) Filed: Jul. 31, 2023

(65) Prior Publication Data

US 2025/0042550 A1　　Feb. 6, 2025

(51) Int. Cl.
　　　B64D 11/06　　　　(2006.01)
　　　B64C 19/00　　　　(2006.01)
(52) U.S. Cl.
　　　CPC .......... B64D 11/0639 (2014.12); B64C 19/00 (2013.01)
(58) Field of Classification Search
　　　CPC .................................................. B64D 11/0639
　　　See application file for complete search history.

(56) References Cited

U.S. PATENT DOCUMENTS

| | | | |
|---|---|---|---|
| 6,691,970 B1 * | 2/2004 | Sutton, Sr. ............... | B60N 2/14 248/425 |
| 2019/0031049 A1 * | 1/2019 | Last ................... | B64D 11/0639 |
| 2020/0001754 A1 * | 1/2020 | Davis ................. | B64D 11/0696 |
| 2024/0025547 A1 * | 1/2024 | Marutzky .............. | B60N 2/146 |
| 2025/0074597 A1 * | 3/2025 | Thisius .............. | B64D 11/0626 |
| 2025/0145296 A1 * | 5/2025 | Hong ................. | B64D 11/0696 |
| 2025/0197009 A1 * | 6/2025 | Johannessen ........ | B64D 11/064 |

FOREIGN PATENT DOCUMENTS

| | | | | |
|---|---|---|---|---|
| CA | 3052734 A1 * | 2/2020 | ......... | B64D 11/0648 |
| CN | 116039928 B * | 8/2025 | ......... | B64D 11/0689 |
| EP | 4056474 A1 * | 9/2022 | ......... | B64D 11/0639 |
| EP | 4306414 A1 * | 1/2024 | ......... | B64D 11/0639 |

* cited by examiner

*Primary Examiner* — Christopher P Ellis
(74) *Attorney, Agent, or Firm* — SLATER MATSIL, LLP

(57) ABSTRACT

A system and method for a central control arm with tensioning for a lateral tracking and swivel system in a seat are provided. The control system includes a central control arm body, where the central control arm body has one or more attachment points and a cable interface feature, one or more paddle arms, and one or more adjustment mechanisms attached to the central control arm body, where each adjustment mechanism of the one or more adjustment mechanisms is aligned longitudinally along the central control arm body with a respective attachment point of the one or more attachment points, where each adjustment mechanism of the one or more adjustment mechanisms has a set screw that impinges on a face of a paddle arm of the one or more paddle arms.

20 Claims, 8 Drawing Sheets

SEAT CENTRAL CONTROL ARM WITH TENSIONING

TECHNICAL FIELD

The present invention relates generally to a system and method for a central control arm for a seat, and, in particular embodiments, to a system and method for a central control arm with tensioning for a lateral tracking and swivel system in, for example, an aircraft seat.

BACKGROUND

Generally, a control mechanism for controlling the positioning of a seat in an aircraft is centered and pivoted on a swivel plate located between the inboard and outboard tracking systems. A control cable is mounted on the swivel plate such that, when pulled, the central arm rotates and interacts with the lateral tracking system of the seat and/or rigid linkages. When activated, the central arm pulls on levers of the lateral tracking mechanism to disengage pawls allowing for the seat to track laterally. Rigid linkages allow for back driving that acts to disengage connected mechanisms when loads are applied to the control mechanism. However, with such systems, it is impossible to make any adjustments to the lateral tracking and/or swivel systems to account for movement of components over time and loosening of the system due to use and/or design tolerances.

Additionally, traditional systems for swiveling include a swivel pin release that is activated through a rotation interface that raises or lowers the pin when a central arm of the control mechanism is rotated. However, these systems result in the applied force being applied out of the plane of movement which decreases how efficiently the control cable forces are utilized and increase the amount of force necessary to activate the swivel mechanism.

SUMMARY

In accordance with a preferred embodiment of the present invention, a system and method for a central control arm with tensioning for a lateral tracking and swivel system in a seat comprises as follows.

In a potential embodiment a control system includes: a central control arm body, where the central control arm body has one or more attachment points and a cable interface feature, where the central control arm body is cylindrical and has a cylindrical hole extending along a centerline axis of rotation of the central control arm body and further has an end tapered to a collar portion, and where the cable interface feature extends outward from the centerline axis of rotation of the central control arm body and has a cable attachment portion; one or more paddle arms, where each paddle arm of the one or more paddle arms are hingedly connected to the central control arm body at a respective attachment point of the one or more attachment points, and where each paddle arm of the one or more paddle arms has a cable attachment point at an end of the paddle arm opposite the attachment point; and one or more adjustment mechanisms attached to the central control arm body and extending outward from the centerline axis of rotation of the central control arm body, where each adjustment mechanism of the one or more adjustment mechanisms is aligned longitudinally along the central control arm body with a respective attachment point of the one or more attachment points, where each adjustment mechanism of the one or more adjustment mechanisms has a set screw extending through the adjustment mechanism substantially perpendicular to the centerline axis of rotation of the central control arm body and has a threaded end of the set screw closest to the respective attachment point, and where each of the set screws impinge on a face of a paddle arm of the one or more paddle arms.

In another potential embodiment, an aircraft seat includes a lateral tracking system including a pawl, and a lever connected the pawl, and a control system including: a central control arm body, where the central control arm body has an attachment point and a cable interface feature, where the central control arm body has a first portion that is substantially cylindrical and has a cylindrical hole extending along a centerline axis of rotation of the central control arm body and further has an end portion tapered to a collar portion, and where the cable interface feature extends outward from the centerline axis of rotation of the central control arm body and has a cable attachment portion; a paddle arm hingedly connected, at a first end, to the central control arm body at the attachment point, where the paddle arm has a cable attachment point at a second end opposite the first end; and an adjustment mechanism attached to the central control arm body and extending outward from the centerline axis of rotation of the central control arm body, where the adjustment mechanism is aligned longitudinally along the central control arm body with the attachment point, where the adjustment mechanism has a set screw extending through the adjustment mechanism substantially perpendicular to the axis of rotation of the central control arm body, where the adjustment mechanism further has a threaded end of the set screw closest to the attachment point, and where the set screw impinges on a face of the paddle arm; a first operating cable attached to the cable interface feature, where the first operating cable is operable to apply a rotational force to the central control arm body; and a second operating cable, where the second operating cable is attached on a first end to the paddle arm, and where the second operating cable is attached on a second end to the lever of the lateral tracking mechanism; where the lever is operable move, based on a rotation of the central control arm body, and disengage the pawl and allow the aircraft seat to track in an inboard and outboard direction while the pawl is disengaged.

In a potential embodiment a control system includes: a central control arm body operable to rotate around a central axis of rotation and to translate a force applied through an attached first operating cable into rotational force about the central axis of rotation; a cable interface feature, where the cable interface feature is attached to a side of the central control arm body and extends outward from the center of the central control arm body, and where the cable interface feature includes a cable attachment point at an end furthest from the central control arm body, and where the first operating cable is attached to the cable attachment point; one or more paddle arms, where each of the one or more paddle arms are hingedly connected to the central control arm body through an attachment point that allows each of the one or more paddle arms to swing in an arc substantially perpendicular to an axis of rotation of the central control arm body, and where each of the one or more paddle arms has a cable attachment point on an end opposite the attachment point to the central control arm body; and one or more adjustment mechanisms in a one-to-one correspondence with the one or more paddle arms, where each of the one or more adjustment mechanisms are aligned longitudinally along the central control arm body with each of the one or more paddle arm attachment points, and where each of the one or more adjustment mechanisms features a set screw threaded through the adjustment mechanism substantially perpendicular to the axis of rotation of the central control arm body, where a threaded end of the set screw impinges on a curved face of a paddle arm of the one or more paddle arms and is operable to limit a hinged range of motion of the respective paddle are of the one or more paddle arms.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments are directed toward improved system controls for the inboard and outboard tracking systems, as well as the operating the swivel locking mechanism, on a seat used in, for example, an aircraft. As can be seen through the disclosures below, the improvements to the system controls provide a high-quality part that allows for ease of maintenance, and adjustment for efficient and easy operation, throughout the life of the seat.

Certain embodiments of the disclosure are discussed within the context of aircraft seating. However, it will be understood that the disclosure is not limited to only aircraft seating, and may find uses in watercraft, automobile, or other passenger vehicle seating as well. It will also be understood that the embodiments disclosed herein may be used with any aircraft, including fixed wing, rotorcraft, commercial, military, or civilian aircraft. Embodiments of the present disclosure are not limited to any particular setting or application, and embodiments can be used in any setting or application such as with other aircraft, vehicles, or equipment.

Figure 1:
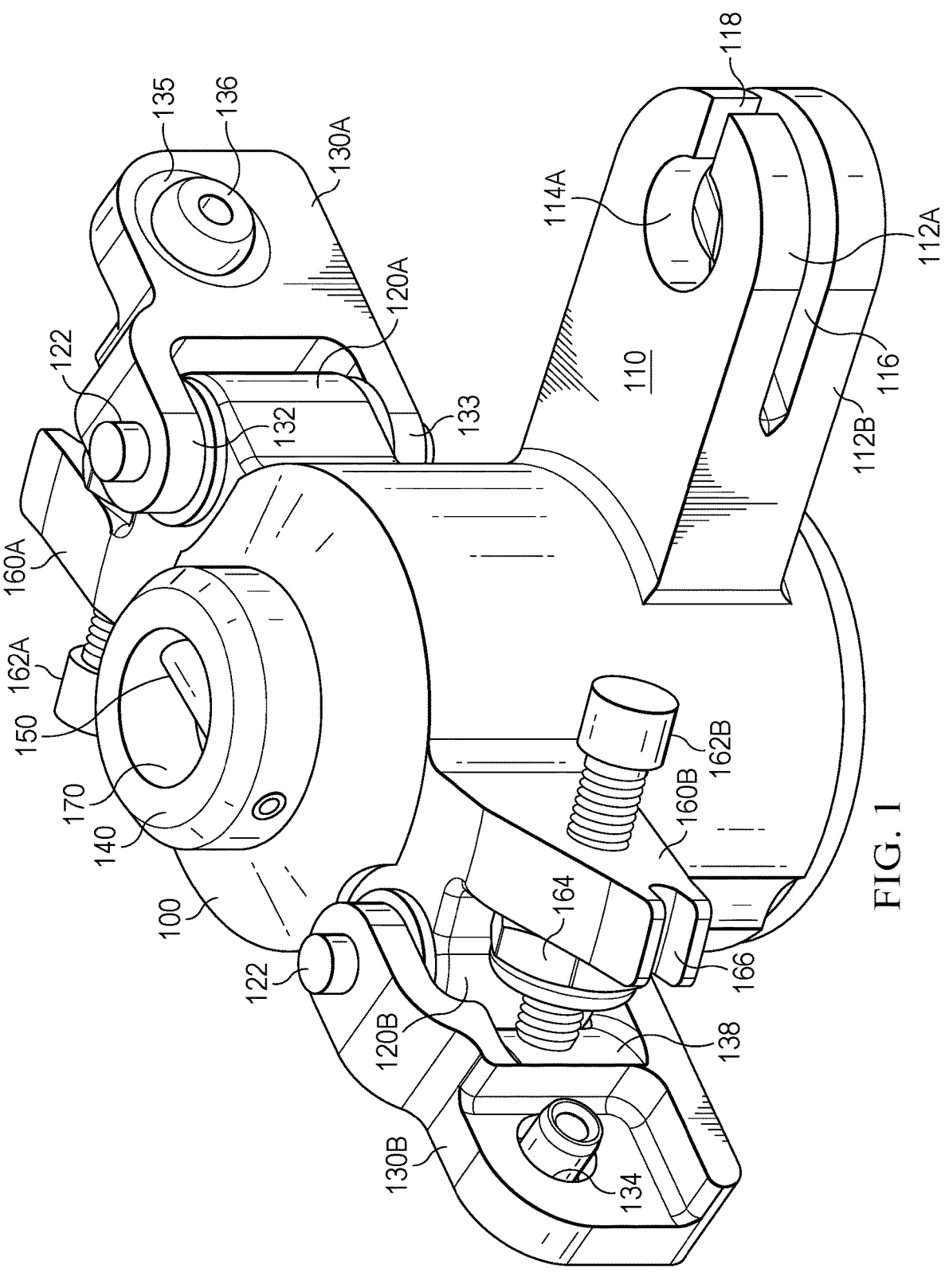
FIG. 1 is a diagram showing a central control arm portion of a control system with tensioning according to some embodiments.

FIG. 1 is a diagram showing a central control arm portion of a control system with tensioning according to some embodiments.

In the embodiment shown in FIG. 1, a central control arm body 100 includes a toolless cable interface feature 110 at or near the base of the central control arm body 100. The toolless cable interface feature 110 features a first prong 112A with a through-hole 114A, and a second prong 112B with a through-hole (not shown). A cable groove 116 is disposed between the first prong 112A and second prong 112B. The first prong 112A features a break 118 such that a cable stop with an attached cable (not shown) may be inserted between through-holes 114A and 114B, allowing the cable to pass the first prong 112A and be secured in the cable groove 116. In such a manner, the toolless cable interface feature facilitates cable installation and replacement without the need for specialized tools.

The central control arm body 100 further has a first center hole 170 in which a central shaft (not shown in FIG. 1) may be located and about which the central control arm body 100 rotates on a fixed axis. A top bushing portion 140 of the central control arm body 100 has a second hole substantially perpendicular to and intersecting the center hole 170. A first retaining pin 150, such as a rolled spring pin 150, bar, bolt, or the like, may be disposed in the second hole and may translate rotational force applied to the central control arm body 100 to the central shaft (not shown). The second hole need not extend fully through the top bushing portion 140 if a screw or mechanism other than a rolled spring pin is used to secure the central control arm body 100 to the central shaft (not shown).

Central control arm body 100 also features two paddle arm attachment points 120A and 120B at or near the top of the central control arm body 100 to which two paddle arms 130A and 130B may be attached and independently adjusted. In some embodiments, the paddle arm attachment points 120A and 120B may be tabs that protrude from the central control arm body 100 and may have a through-hole. In some embodiments, the paddle arms 130A and 130B are attached to respective paddle arm attachment points 120A and 120B by pins 122 allowing the paddle arms 130A and 130B to swivel about the paddle arm attachment points 120A and 120B, but securing the paddle arms 130A and 130B in other directions. In some embodiments, pins 122 may be screws, dowels, or other mechanisms for attachment know in the art. In some embodiments, the paddle arm attachment points 120A and 120B may be located across a diameter of the central control arm body 100.

In some embodiments, paddle arms 130A and 130B each feature two prongs 132 and 133 with holes in them through which pins 122 are used to pin paddle arms 130A to paddle arm attachment points 120A and paddle arms 130B to paddle arm attachment points 120B. In some embodiments, paddle arms 130A and 130B are secured to paddle arm attachment points 120A and 120B with a flange bearing to minimize any resistance that could prevent tensioning of the system. Each of the paddle arms 130A and 130B has a cable attachment point 134.

In some embodiments, the cable attachment point 134 is a hole through each of the paddle arms 130A and 130B, with an indented concave section 135 on one face of each of paddle arms 130A and 130B, where the hole is larger than a size of the cable (not shown), such that the cable end fitting 136 may swivel within the cable attachment point 134. The cable end fitting 136 used to connect operating cables to each of the paddle arms 130A and 130B may be ball-with-shank-end roller swage wire rope end fittings. In other embodiments, the cable may be retained in the cable attachment point 134 by a retaining element such as a collar, clamp, knot, or other retaining element that permits the cable to pivot at the cable attachment point. In such embodiments, the fatigue on operating cables may be reduced by minimizing the bending of the cables during operation.

Associated with each of the paddle arm attachment points 120A and 120B, and protruding from the central control arm body 100, are two adjustment mechanisms 160A and 160B, one aligned with each of the paddle arm attachment points 120A and 120B. Set screws 162A and 162B threaded through each of the two adjustment mechanisms 160A and 160B respectively apply pressure on a face of each of the two independently adjusted paddle arms 130A and 130B. By adjusting the position of the set screws 162A and 162B, limits for the amount of swivel allowed for the paddle arms 130A and 130B may be set, thereby adjusting the tensioning of cables (not shown) attached to the paddle arms 130A and 130B. Set screws 162A and 162B may further have locking nuts 164 to maintain and lock the set screws 162A and 162B in place and to prevent back driving over repeated use.

In some embodiments, each of the paddle arms 130A and 130B further includes a curved tensioning adjustment face 138 for interacting with the set screws 162A and 162B (collectively 162). The curved tensioning adjustment face 138 may be curved such that a moment of the curved tensioning adjustment face 138 is substantially perpendicular (within about +/−5 degrees) to the axis of the shaft of the set screw 162 at the point of impact across a range of positions of the set screw 162.

In some embodiments, the adjustment mechanisms 160A and 160B each include a cable sheeve portion 166 at the outer end. The cable sheeve portion 166 includes a cable groove in which an operating cable (not shown) may be aligned during operation of the control system with tensioning. The groove in the cable sheeve portion 166 may be curved along an arc substantially similar (within about +/−) 5° to the rotation of the central control arm body 100. Thus, an operating cable (not shown) may maintain a more consistent arc-length radius through operation. Such a configuration also reduces stresses on the operating cable (not shown), and a more consistent force necessary for operation can be maintained throughout the range of operation.

Figure 2A:
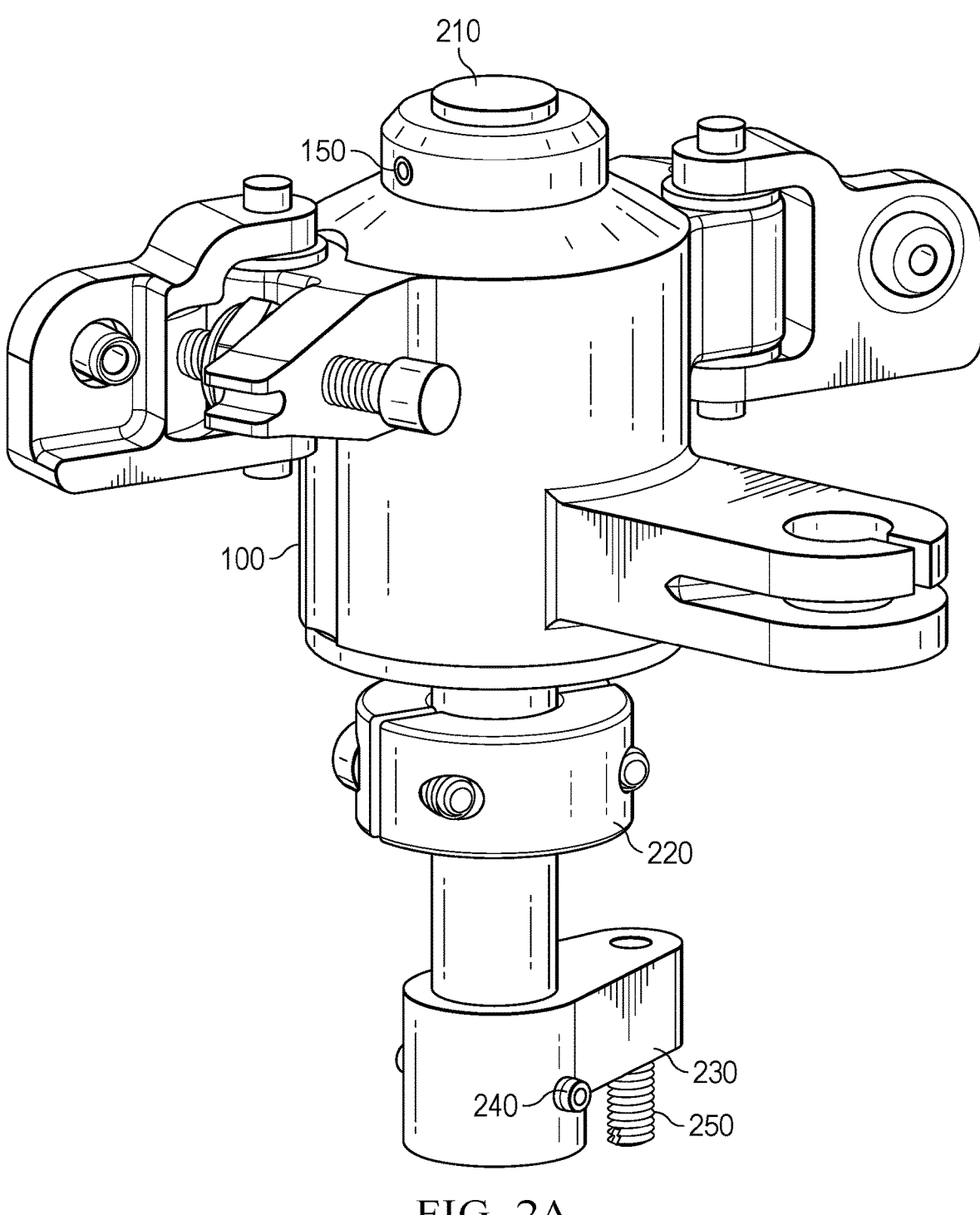
FIG. 2A is a diagram showing a control system with tensioning according to some embodiments.

FIG. 2A is a diagram showing a control system with tensioning according to some embodiments. The central control arm body 100 is connected to a central shaft 210. The central shaft 210 may run through the entire length of the central control arm body 100, and protrude out the top and bottom of the central control arm body 100. A first rolled spring pin 150 may be inserted through the central control arm body 100 and the central shaft 210 such that rotational force is translated from the central control arm body 100 to the central shaft 210 through the first rolled spring pin 150. A locking screw, or other mechanism know in the art, may be used to translate force from the central control arm body 100 to the central shaft 210 in some embodiments.

The bottom of the central control arm body 100 may be attached to a swivel plate through a swivel plate mounting features (not shown), where the central shaft 210 extends through the swivel plate (not shown). The swivel plate mounting feature may be a hollow post which allows the central control arm body 100 to rotate and handle all forces associated with operation. In some embodiments, one or more bearings may be used to mount the central control arm body 100 to the swivel plate mounting feature to minimize rattle and friction. Below the swivel plate (not shown), a shaft collar 220 may be attached to the central shaft 210 to prevent the central control arm body 100 from walking up and/or off the swivel plate mounting feature.

A lever arm 230 may further be included at a bottom end of the central shaft 210. The lever arm 230 may be attached to the central shaft 210 using a second rolled spring pin 240 such that rotational force applied to the central control arm body 100 is translated from the central control arm body 100 to the central shaft 210 through the first rolled spring pin 150, and then from the central shaft 210 to the lever arm 230 through the second rolled spring pin 240.

In some embodiments, the lever arm 230 may have an operating pin 250 to interface with a swivel unlocking plate (not shown) such that, when rotational force is applied to the central control arm body 100, the lever arm 230 translates a portion of the applied force to the swivel unlocking mechanism (not shown).

Figure 2B:
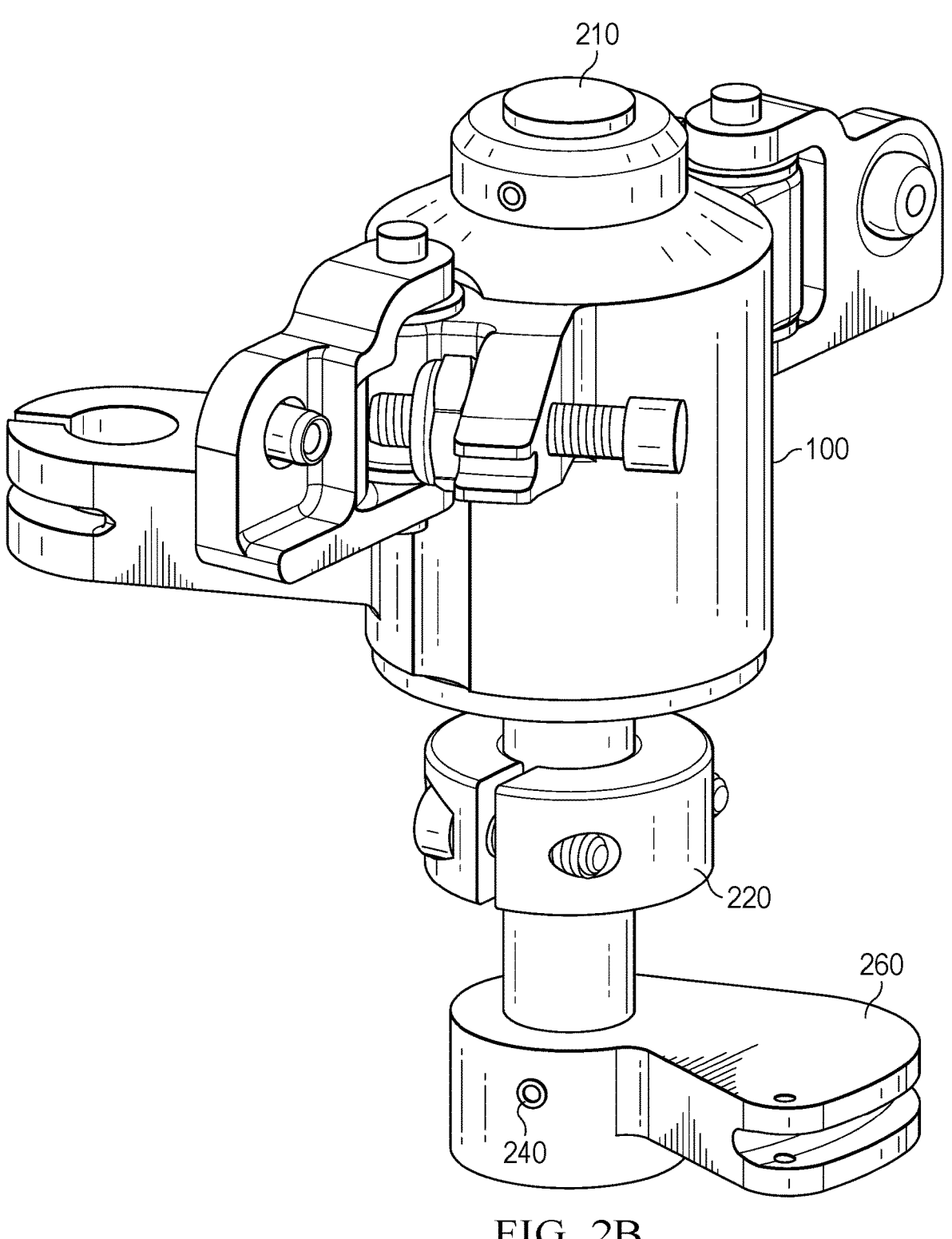
FIG. 2B is a diagram showing another control system with tensioning according to some embodiments.

FIG. 2B is a diagram showing another control system with tensioning according to some embodiments. In this embodiment a cable sheeve attachment 260 may be used in conjunction with, or as an alternative to the lever arm 230 shown in FIG. 2A, to operate the swivel unlocking mechanism. Similar to the cable sheeve portion 166 of adjustment mechanisms 160A, the cable sheeve attachment 260 may have a groove on an outer edge that facilitates connecting a cable end to the cable sheeve attachment 260. The groove in the cable sheeve attachment may have a radius such that it maintains substantially similar operating radius of an attached cable throughout a range of rotation of the cable sheeve attachment 260.

Figure 3:
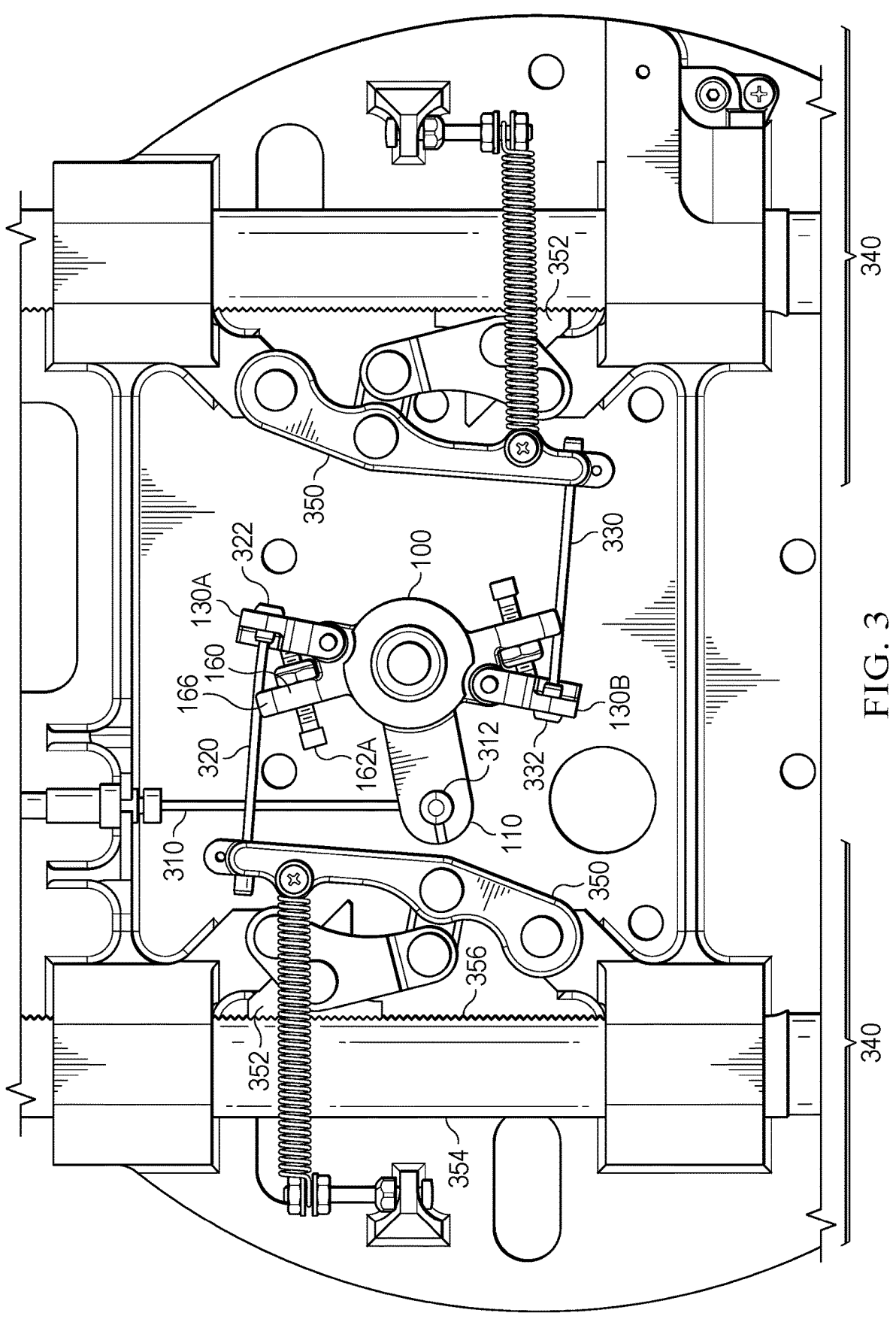
FIGS. 3 and 4 are diagrams showing a control system with tensioning installed on a swivel plate and further showing the lateral tracking mechanisms according to some embodiments.
Figure 4:
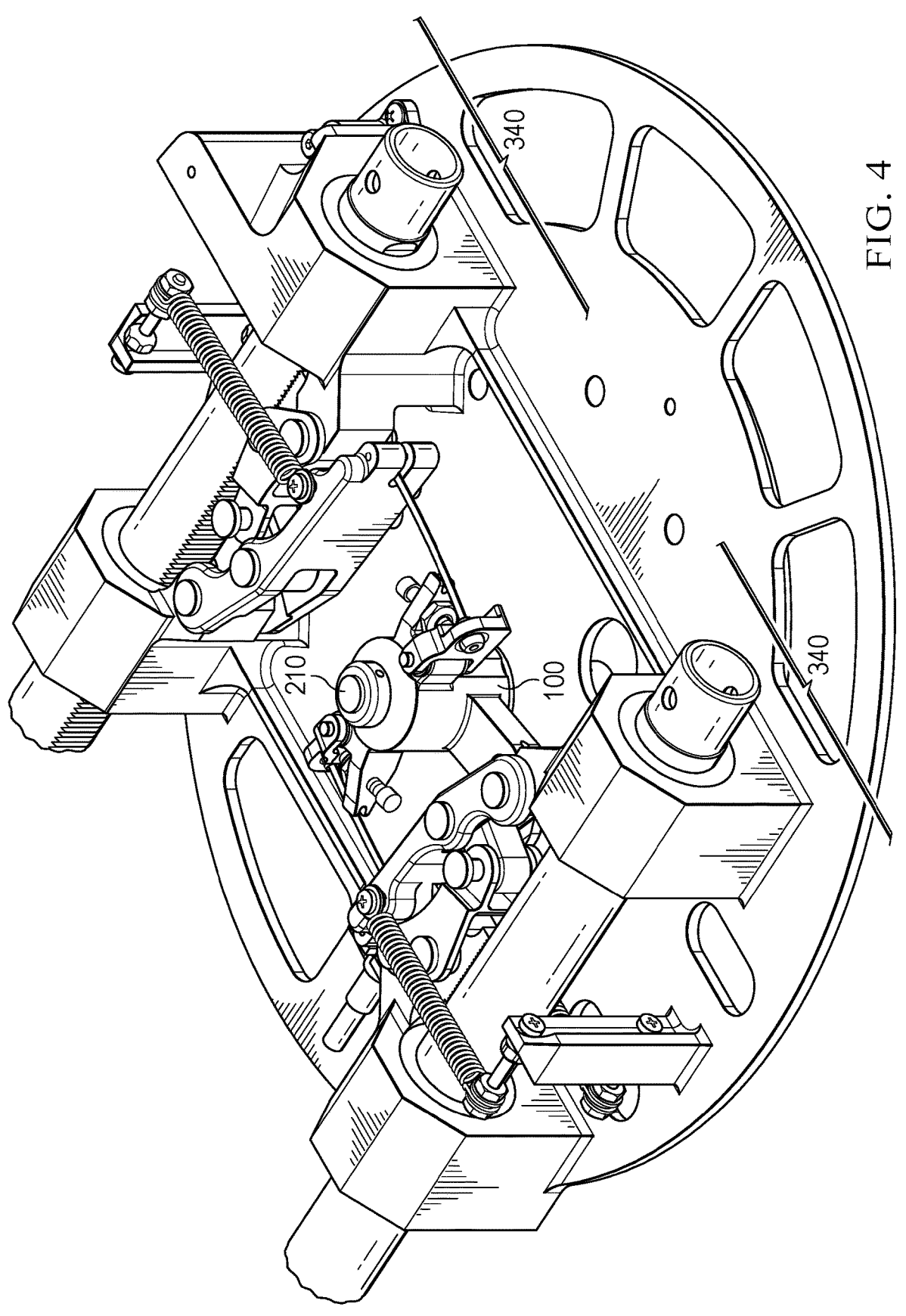

FIGS. 3 and 4 illustrate an embodiment from two different perspectives where the central control arm body 100 is connected with other elements of the control system with tensioning, including cabling. FIG. 3 is a top view of the control arm assembly according to some embodiments. FIG. 4 is a perspective view illustrates the mechanisms described in FIG. 3 from another angle. In some embodiments, a first operating cable 310 with a barrel terminator 312 is connected to the toolless cable interface feature 110. The first operating cable 310 may be operated with an electronic solenoid or servo, or through operating linkages and/or buttons. Pulling on the first operating cable 310 results in force being applied to the toolless cable interface feature 110 which causes the central control arm body 100 to rotate in a clockwise direction.

Second operating cable 320 is connected to paddle arm 130A. In some embodiments, the second operating cable 320 is attached to paddle arm 130A via using a ball-with-shank-end roller swage wire rope end fitting 322 at the end of the second operating cable 320. Similarly, a third operating cable 330 is connected to paddle arm 130B. In some embodiments the third operating cable 330 is attached to paddle arm 130B using a ball-with-shank-end roller swage wire rope end fitting 332 at the end of the third operating cable 330. The other ends of second operating cable 320 and third operating cable 330 may be connected to operating levers 350 of a lateral tracking mechanism 340 to allow for the seat to track laterally. In some embodiments, operating levers 350 may include pins or other mechanisms serving to disengage a pawl 352 of a lateral tracking mechanism. In some embodiments, the second operating cable 320 and third operating cable 330 may be acting against a spring force in the lateral tracking mechanism to move the operating levers 350 and disengage pawl 452 from a locking portion 356 of a tracking bar 354 of the lateral tracking mechanism 340 to allow inboard/outboard tracking.

Accordingly, when a pulling force is applied to the first operating cable 310, a force is applied to the toolless cable interface feature 110 which causes the central control arm body 100 to rotate in a clockwise direction. In conjunction, the rotational force is applied to, for example, paddle arm 130A from the central control arm body 100, to the adjustment mechanism 160A, to the associated set screw 162A, to the paddle arms 130A via the associated curved tensioning adjustment face 138. This results in a pulling force being applied to the second operating cable 320, and the pulling force and the effective pulling radius on the second operating cable 320 is maintained through the range of rotation of the central control arm body 100 as the second operating cable 320 is impinged in and on the cable sheeve portion 166 of adjustment mechanisms 160A. The pulling force applied to the second operating cable 320 is translated by the cabling to, for example, an operating lever 350 of a lateral tracking mechanism 340 allowing a locking mechanism of the lateral tracking mechanism 340 to disengage, and allowing the seat to move along the tracking bar 354 of the lateral tracking mechanism 340.

The third operating cable 330 may be similarly connected and operated by the central control arm body 100, and another lever of the lateral tracking mechanism such that both levers (attached to the second operating cable 320 and third operating cable 330) are required to be operated for the lateral tracking mechanism 340 to be allowed to move.

Figure 5:
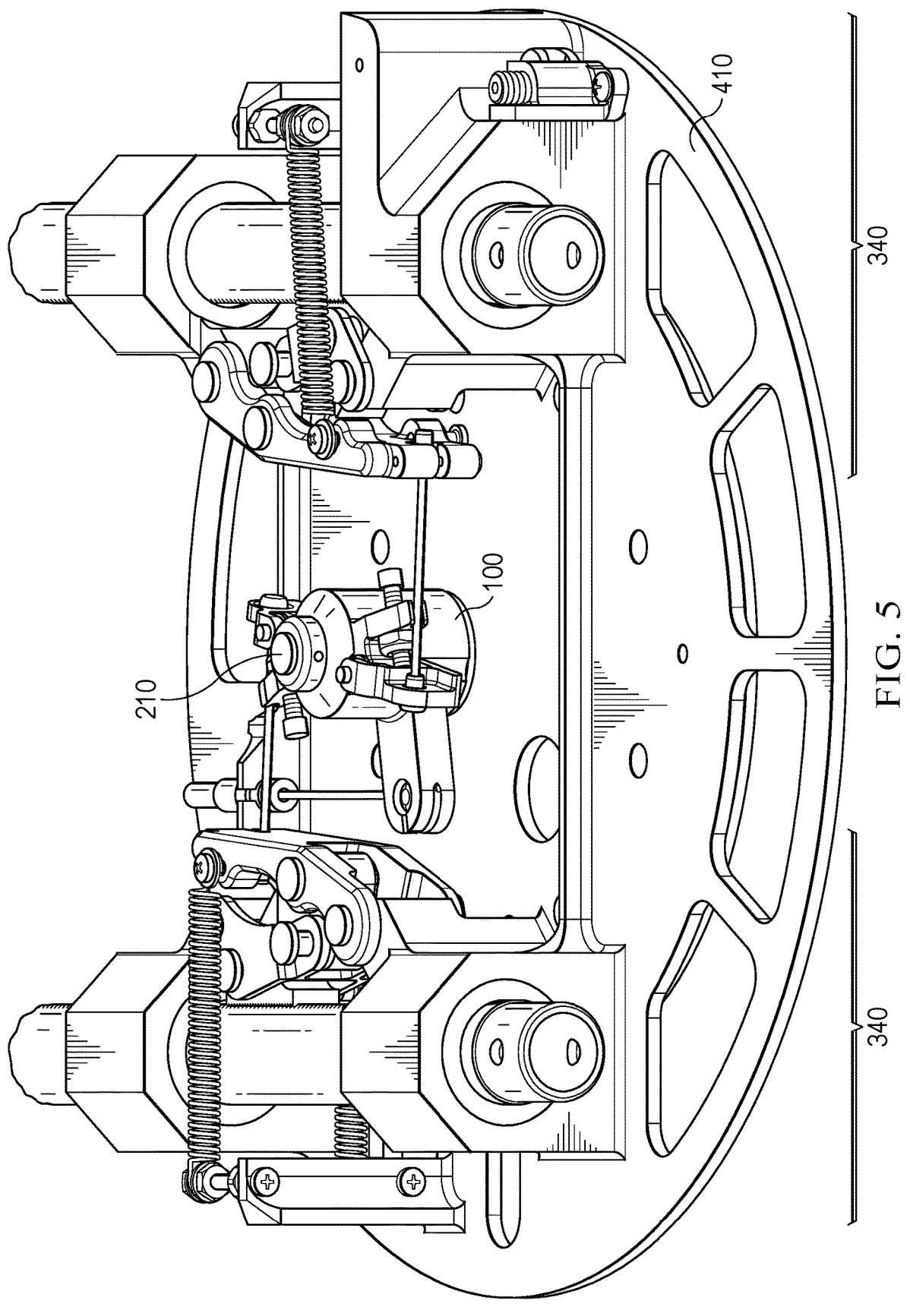
FIG. 5 is a view of a diagram showing a control system with tensioning installed on a swivel plate further showing the lateral tracking mechanism according to some embodiments.

FIG. 5 is a view of a diagram showing a control system with tensioning installed on a swivel plate 410, further showing the lateral tracking mechanism 340, according to some embodiments. The central control arm body 100 is attached to a swivel plate 410. The bottom of the central control arm body 100 may be attached to the swivel plate 410 through a swivel plate mounting feature, where the central shaft 210 extends through the swivel plate 410. In some embodiments, the swivel plate mounting feature may be a collar, bushing, or hollow post, with the central shaft extending though an opening in the swivel plate mounting feature. This allows the central control arm body 100 to rotate and handle all forces associated with operation. One or more bearings may be used to mount the central control arm body 100 to the swivel plate mounting feature to minimize rattle and friction.

Figure 6:
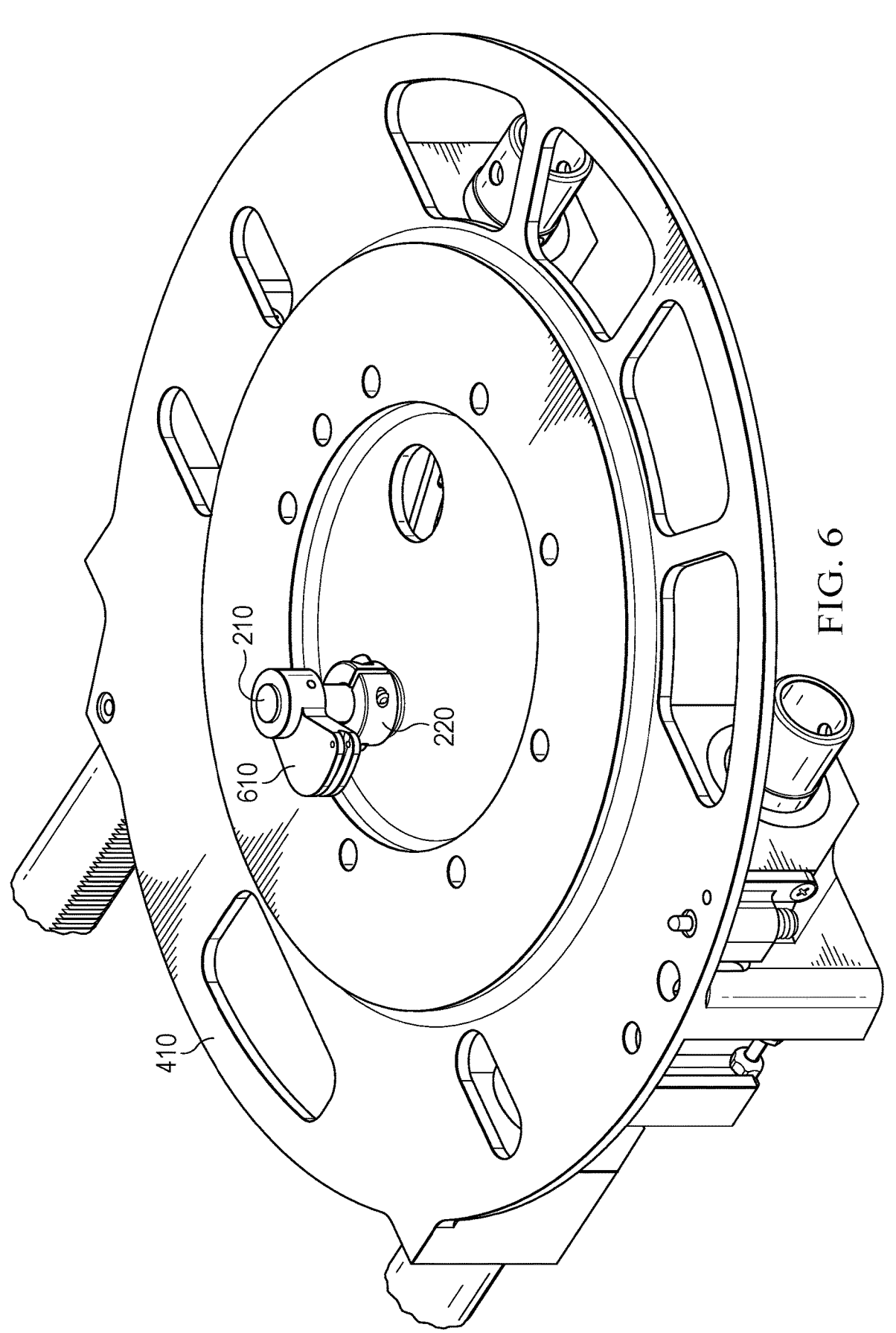
FIG. 6 is a view of a diagram showing a control system with tensioning installed on a swivel plate according to some embodiments.

FIG. 6 is a view of a diagram showing a control system with tensioning installed on a swivel plate according to some embodiments.

A shaft collar 220 may be attached to the central shaft 210 opposite the swivel plate 410 from the central control arm body 100. The shaft collar 220 prevents the central control arm body 100 from walking up and/or off the swivel plate mounting feature. The lever arm 230 is attached to the central shaft 210. In some embodiments, a cable operating arm 610 may also be attached to the central shaft 210, in conjunction with lever arm 230, for additionally operating other components of the swivel unlocking mechanism (not shown).

Figure 7:
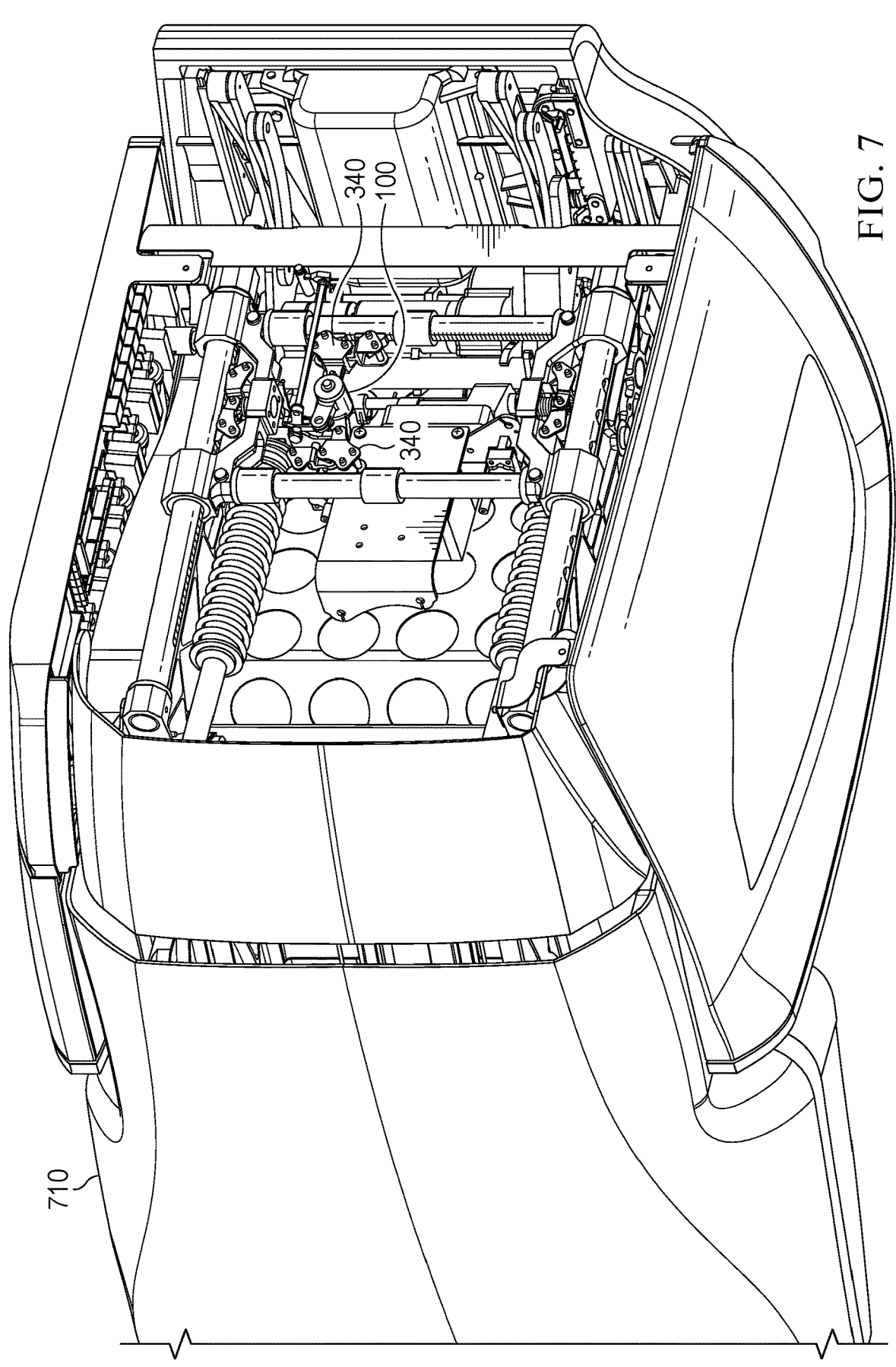
FIG. 7 is a cropped view of a diagram showing a control system with tensioning installed in an aircraft seat according to some embodiments.

FIG. 7 is a perspective view of a diagram showing a control system with tensioning installed in an aircraft seat 710 according to some embodiments where the aircraft seat is partially cropped to better show the arrangement of elements of the control system with tensioning within the aircraft seat. The swivel plate (410 in FIG. 5, not shown here) is mounted in the base of the aircraft seat 710. The central control arm body 100 is mounted above the swivel plate 410 on a face of the swivel plate 410, and secured to the swivel plate with the shaft collar 220 placed on the central shaft 210 in the aircraft seat 710. As described in relation to FIG. 3 above, pulling on the first operating cable 310 results in force being applied to the toolless cable interface feature 110 which causes the central control arm body 100 to rotate in a clockwise direction. This rotational force applied to the central control arm body 100, is translated to the central shaft 210 through the first rolled spring pin 150, and then from the central shaft 210 to the lever arm 230 through the second rolled spring pin 240. The lever arm 230 may be supplied with an operating pin 250 to interface with a swivel unlocking plate (not shown) such that, when rotational force is applied to the central control arm body 100, the lever arm 230 translates a portion of the applied force to the swivel unlocking plate (not shown).

In a potential embodiment a control system includes: a central control arm body, where the central control arm body has one or more attachment points and a cable interface feature, where the central control arm body is cylindrical and has a cylindrical hole extending along a centerline axis of rotation of the central control arm body and further has an end tapered to a collar portion, and where the cable interface feature extends outward from the centerline axis of rotation of the central control arm body and has a cable attachment portion; one or more paddle arms, where each paddle arm of the one or more paddle arms are hingedly connected to the central control arm body at a respective attachment point of the one or more attachment points, and where each paddle arm of the one or more paddle arms has a cable attachment point at an end of the paddle arm opposite the attachment point; and one or more adjustment mechanisms attached to the central control arm body and extending outward from the centerline axis of rotation of the central control arm body, where each adjustment mechanism of the one or more adjustment mechanisms is aligned longitudinally along the central control arm body with a respective attachment point of the one or more attachment points, where each adjustment mechanism of the one or more adjustment mechanisms has a set screw extending through the adjustment mechanism substantially perpendicular to the centerline axis of rotation of the central control arm body and has a threaded end of the set screw closest to the respective attachment point, and where each of the set screws impinge on a face of a paddle arm of the one or more paddle arms.

In a possible implementation, the cable interface feature is a toolless cable interface feature, where the cable attachment portion of the toolless cable interface feature includes a first prong with a major plane substantially perpendicular to the centerline axis of rotation of the central control arm body, where the first prong has a through-hole and a break in the first prong from the through-hole to an outer edge of the toolless cable interface feature, where the toolless cable interface feature further includes a second prong with a major axis substantially parallel to, and inline with, the major plane of the first prong, where the second prong further has a through-hole aligned with the through-hole of the first prong, and where a cable groove is disposed between the first prong and second prong.

In a possible implementation, the one or more adjustment mechanisms each include a cable sheeve portion at an outer end of an arm protruding from the central control arm body, and where the cable sheeve portion includes a cable groove aligned with the cable attachment point of a respective paddle arm along a plane substantially perpendicular to the centerline axis of rotation of the central control arm body.

In a possible implementation, the cable groove in each of the one or more adjustment mechanisms is curved along an arc substantially similar to a rotational arc of the central control arm body.

In a possible implementation, the control system further includes a swivel plate, where the swivel plate is connected to the central control arm body at an end of the central control arm body opposite the collar portion, and where a major plane of the swivel plate is substantially perpendicular to the centerline axis of rotation of the central control arm body.

In a possible implementation, a first end of a central shaft is attached to the central control arm body at the collar portion of the central control arm body, where the central shaft extends out of the central control arm body opposite the collar portion, and through the swivel plate, where a lever arm is attached at a second end of the central shaft opposite the central control arm body, and where a shaft collar is affixed to the central shaft between the swivel plate and the lever arm.

In a possible implementation, the central shaft is attached to the central control arm body with a first rolled spring pin, and where the central shaft is attached to the lever arm with a second rolled spring pin.

In a possible implementation, each of the one or more paddle arms include a curved tensioning adjustment face, and where the curved tensioning adjustment face is curved such that a tangent of the curved tensioning adjustment face is substantially perpendicular to an axis of a shaft of an associated set screw as the paddle arm pivots around a respective attachment point of the one or more attachment points and through at least a portion of an operable pivot range corresponding to an adjustable length of the associated set screw.

In a possible implementation, a first operating cable is attached to the cable interface feature, and where the central control arm body is configured to rotate around a fixed axis when a pulling force is applied to the first operating cable.

In a possible implementation, the one more paddle arms include two paddle arms, where a second operating cable is attached on a first end to a first paddle arm of the two paddle arms, where a third operating cable is attached on a first end to a second paddle arm of the two paddle arms, where a second end of the second operating cable is attached to a first operating lever of a lateral tracking system, and where a second end of the third operating cable is attached to a second operating lever of the lateral tracking system.

In another potential embodiment, an aircraft seat includes a lateral tracking system including a pawl, and a lever connected the pawl, and a control system including: a central control arm body, where the central control arm body has an attachment point and a cable interface feature, where the central control arm body has a first portion that is substantially cylindrical and has a cylindrical hole extending along a centerline axis of rotation of the central control arm body and further has an end portion tapered to a collar portion, and where the cable interface feature extends outward from the centerline axis of rotation of the central control arm body and has a cable attachment portion; a paddle arm hingedly connected, at a first end, to the central control arm body at the attachment point, where the paddle arm has a cable attachment point at a second end opposite the first end; and an adjustment mechanism attached to the central control arm body and extending outward from the centerline axis of rotation of the central control arm body, where the adjustment mechanism is aligned longitudinally along the central control arm body with the attachment point, where the adjustment mechanism has a set screw extending through the adjustment mechanism substantially perpendicular to the axis of rotation of the central control arm body, where the adjustment mechanism further has a threaded end of the set screw closest to the attachment point, and where the set screw impinges on a face of the paddle arm; a first operating cable attached to the cable interface feature, where the first operating cable is operable to apply a rotational force to the central control arm body; and a second operating cable, where the second operating cable is attached on a first end to the paddle arm, and where the second operating cable is attached on a second end to the lever of the lateral tracking mechanism; where the lever is operable move, based on a rotation of the central control arm body, and disengage the pawl and allow the aircraft seat to track in an inboard and outboard direction while the pawl is disengaged.

In a possible implementation, the cable interface feature is a toolless cable interface feature, where the cable attachment portion of the toolless cable interface feature includes a first prong with a major plane substantially perpendicular to the centerline axis of rotation of the central control arm body with a through-hole and a break in the first prong from the through-hole to an outer edge of the toolless cable interface feature, where the toolless cable interface feature includes a second prong with a major axis substantially parallel to and in line with the major plane of the first prong and with a through-hole aligned with the through-hole of the first prong, and where a cable groove is disposed between the first prong and second prong for the first operating cable to ride in.

In a possible implementation, the adjustment mechanism includes a cable sheeve portion at an outer end of an arm protruding from the central control arm body, and where the cable sheeve portion includes a cable groove aligned with the cable attachment portion of the paddle arm along a plane substantially perpendicular to the axis of rotation of the central control arm body.

In a possible implementation, the cable groove in the adjustment mechanism is curved along an arc substantially similar to a rotational arc of the central control arm body.

In a possible implementation, the aircraft seat further includes a swivel plate on which the aircraft seat swivels, where the swivel plate is connected to the central control arm body at an end of the central control arm body opposite the collar portion, and where the major plane of the swivel plate is substantially perpendicular to the central axis of rotation of the central control arm body.

In a possible implementation, a first end of a central shaft is attached to the central control arm body at the collar portion the central control arm body, where the central shaft extends out of the central control arm body opposite the collar portion, and through the swivel plate, where a lever arm is attached at a second end of the central shaft opposite the central control arm body, and where a shaft collar is affixed to the central shaft between the swivel plate and the lever arm.

In a possible implementation, the central shaft is attached to the central control arm body with a first rolled spring pin, and where the central shaft is attached to the lever arm with a second rolled spring pin.

In a possible implementation, the paddle arm includes a curved tensioning adjustment face, and where the curved tensioning adjustment face is curved such that a tangent of the curved tensioning adjustment face is substantially perpendicular to an axis of a shaft of the set screw as the paddle arm pivots around the attachment point through at least a portion of an operable pivot range corresponding to an adjustable length of the set screw.

In a potential embodiment a control system includes: a central control arm body operable to rotate around a central axis of rotation and to translate a force applied through an attached first operating cable into rotational force about the central axis of rotation; a cable interface feature, where the cable interface feature is attached to a side of the central control arm body and extends outward from the center of the central control arm body, and where the cable interface feature includes a cable attachment point at an end furthest from the central control arm body, and where the first operating cable is attached to the cable attachment point; one or more paddle arms, where each of the one or more paddle arms are hingedly connected to the central control arm body through an attachment point that allows each of the one or more paddle arms to swing in an arc substantially perpendicular to an axis of rotation of the central control arm body, and where each of the one or more paddle arms has a cable attachment point on an end opposite the attachment point to the central control arm body; and one or more adjustment mechanisms in a one-to-one correspondence with the one or more paddle arms, where each of the one or more adjustment mechanisms are aligned longitudinally along the central control arm body with each of the one or more paddle arm attachment points, and where each of the one or more adjustment mechanisms features a set screw threaded through the adjustment mechanism substantially perpendicular to the axis of rotation of the central control arm body, where a threaded end of the set screw impinges on a curved face of a paddle arm of the one or more paddle arms and is operable to limit a hinged range of motion of the respective paddle are of the one or more paddle arms.

In a possible implementation, the control system further includes: a swivel plate, where the swivel plate is connected to a base of the central control arm body at a first end of the central control arm body opposite a collar portion, and where the major plane of the swivel plate is substantially perpendicular to the axis of rotation of the central control arm body; a central shaft, where the central shaft is attached to the central control arm body at the collar portion of the central control arm body, where the central shaft extends through a hole that extends along the axis or rotation of the central control arm body, out the first end of the central control arm body opposite, and through the swivel plate; a lever arm, where the lever arm is attached at a second end of the central shaft opposite the swivel plate from the central control arm body; and a shaft collar, where a shaft collar is affixed to the central shaft between the swivel plate and the lever arm operable to keep the central control arm body from moving off the swivel plate.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

It is therefore intended that the appended claims encompass any such modifications or embodiments.

What is claimed is:

1. A control system comprising:
a central control arm body, wherein the central control arm body has one or more attachment points and a cable interface feature, wherein the central control arm body is cylindrical and has a cylindrical hole extending along a centerline axis of rotation of the central control arm body and further has an end tapered to a collar portion, and wherein the cable interface feature extends outward from the centerline axis of rotation of the central control arm body and has a cable attachment portion;
one or more paddle arms, wherein each paddle arm of the one or more paddle arms are hingedly connected to the central control arm body at a respective attachment point of the one or more attachment points, and wherein each paddle arm of the one or more paddle arms has a cable attachment point at an end of the paddle arm opposite the attachment point; and
one or more adjustment mechanisms attached to the central control arm body and extending outward from the centerline axis of rotation of the central control arm body, wherein each adjustment mechanism of the one or more adjustment mechanisms is aligned longitudinally along the central control arm body with a respective attachment point of the one or more attachment points, wherein each adjustment mechanism of the one or more adjustment mechanisms has a set screw extending through the adjustment mechanism substantially perpendicular to the centerline axis of rotation of the central control arm body and has a threaded end of the set screw closest to the respective attachment point, and wherein each of the set screws impinge on a face of a paddle arm of the one or more paddle arms.

2. The control system of claim 1, wherein the cable interface feature is a toolless cable interface feature, wherein the cable attachment portion of the toolless cable interface feature comprises a first prong with a major plane substantially perpendicular to the centerline axis of rotation of the central control arm body, wherein the first prong has a through-hole and a break in the first prong from the through-hole to an outer edge of the toolless cable interface feature, wherein the toolless cable interface feature further comprises a second prong with a major axis substantially parallel to, and inline with, the major plane of the first prong, wherein the second prong further has a through-hole aligned with the through-hole of the first prong, and wherein a cable groove is disposed between the first prong and second prong.

3. The control system of claim 1, wherein the one or more adjustment mechanisms each include a cable sheeve portion at an outer end of an arm protruding from the central control arm body, and wherein the cable sheeve portion includes a cable groove aligned with the cable attachment point of a respective paddle arm along a plane substantially perpendicular to the centerline axis of rotation of the central control arm body.

4. The control system of claim 3, wherein the cable groove in each of the one or more adjustment mechanisms is curved along an arc substantially similar to a rotational arc of the central control arm body.

5. The control system of claim 1, wherein the control system further includes a swivel plate, wherein the swivel plate is connected to the central control arm body at an end of the central control arm body opposite the collar portion, and wherein a major plane of the swivel plate is substantially perpendicular to the centerline axis of rotation of the central control arm body.

6. The control system of claim 5, wherein a first end of a central shaft is attached to the central control arm body at the collar portion of the central control arm body, wherein the central shaft extends out of the central control arm body opposite the collar portion, and through the swivel plate, wherein a lever arm is attached at a second end of the central shaft opposite the central control arm body, and wherein a shaft collar is affixed to the central shaft between the swivel plate and the lever arm.

7. The control system of claim 6, wherein the central shaft is attached to the central control arm body with a first rolled spring pin, and wherein the central shaft is attached to the lever arm with a second rolled spring pin.

8. The control system of claim 1, wherein each of the one or more paddle arms include a curved tensioning adjustment face, and wherein the curved tensioning adjustment face is curved such that a tangent of the curved tensioning adjust-ment face is substantially perpendicular to an axis of a shaft of an associated set screw as the respective paddle arm pivots around a respective attachment point of the one or more attachment points and through at least a portion of an operable pivot range corresponding to an adjustable length of the associated set screw.

9. The control system of claim 1, wherein a first operating cable is attached to the cable interface feature, and wherein the central control arm body is configured to rotate around a fixed axis when a pulling force is applied to the first operating cable.

10. The control system of claim 9, wherein the one or more paddle arms comprise two paddle arms, wherein a second operating cable is attached on a first end to a first paddle arm of the two paddle arms, wherein a third operating cable is attached on a first end to a second paddle arm of the two paddle arms, wherein a second end of the second operating cable is attached to a first operating lever of a lateral tracking system, and wherein a second end of the third operating cable is attached to a second operating lever of the lateral tracking system.

11. An aircraft seat comprising:
a lateral tracking system comprising:
a pawl; and
a lever connected the pawl; and
a control system comprising:
a central control arm body, wherein the central control arm body has an attachment point and a cable interface feature, wherein the central control arm body has a first portion that is substantially cylindri-cal and has a cylindrical hole extending along a centerline axis of rotation of the central control arm body and further has an end portion tapered to a collar portion, and wherein the cable interface fea-ture extends outward from the centerline axis of rotation of the central control arm body and has a cable attachment portion;
a paddle arm hingedly connected, at a first end, to the central control arm body at the attachment point, wherein the paddle arm has a cable attachment point at a second end opposite the first end; and
an adjustment mechanism attached to the central con-trol arm body and extending outward from the cen-terline axis of rotation of the central control arm body, wherein the adjustment mechanism is aligned longitudinally along the central control arm body with the attachment point, wherein the adjustment mechanism has a set screw extending through the adjustment mechanism substantially perpendicular to the centerline axis of rotation of the central control arm body, wherein the adjustment mechanism fur-ther has a threaded end of the set screw closest to the attachment point, and wherein the set screw impinges on a face of the paddle arm;
a first operating cable attached to the cable interface feature, wherein the first operating cable is operable to apply a rotational force to the central control arm body; and
a second operating cable, wherein the second operating cable is attached on a first end to the paddle arm, and wherein the second operating cable is attached on a second end to the lever of the lateral tracking mecha-nism; and
wherein the lever is operable move, based on a rotation of the central control arm body, and disengage the pawl and allow the aircraft seat to track in an inboard and outboard direction while the pawl is disengaged.

12. The aircraft seat of claim 11, wherein the cable interface feature is a toolless cable interface feature, wherein the cable attachment portion of the toolless cable interface feature comprises a first prong with a major plane substan-tially perpendicular to the centerline axis of rotation of the central control arm body with a through-hole and a break in the first prong from the through-hole to an outer edge of the toolless cable interface feature, wherein the toolless cable interface feature comprises a second prong with a major axis substantially parallel to and in line with the major plane of the first prong and with a through-hole aligned with the through-hole of the first prong, and wherein a cable groove is disposed between the first prong and second prong for the first operating cable to ride in.

13. The aircraft seat of claim 11, wherein the adjustment mechanism comprises a cable sheeve portion at an outer end of an arm protruding from the central control arm body, and wherein the cable sheeve portion includes a cable groove aligned with the cable attachment portion of the paddle arm along a plane substantially perpendicular to an axis of rotation of the central control arm body.

14. The aircraft seat of claim 13, wherein the cable groove in the adjustment mechanism is curved along an arc sub-stantially similar to a rotational arc of the central control arm body.

15. The aircraft seat of claim 11, wherein the aircraft seat further includes a swivel plate on which the aircraft seat swivels, wherein the swivel plate is connected to the central control arm body at an end of the central control arm body opposite the collar portion, and wherein the major plane of the swivel plate is substantially perpendicular to a central axis of rotation of the central control arm body.

16. The aircraft seat of claim 15, wherein a first end of a central shaft is attached to the central control arm body at the collar portion the central control arm body, wherein the central shaft extends out of the central control arm body opposite the collar portion, and through the swivel plate, wherein a lever arm is attached at a second end of the central shaft opposite the central control arm body, and wherein a shaft collar is affixed to the central shaft between the swivel plate and the lever arm.

17. The control system of claim 16, wherein the central shaft is attached to the central control arm body with a first rolled spring pin, and wherein the central shaft is attached to the lever arm with a second rolled spring pin.

18. The control system of claim 11, wherein the paddle arm includes a curved tensioning adjustment face, and wherein the curved tensioning adjustment face is curved such that a tangent of the curved tensioning adjustment face is substantially perpendicular to an axis of a shaft of the set screw as the paddle arm pivots around the attachment point through at least a portion of an operable pivot range corresponding to an adjustable length of the set screw.

19. A control system comprising:

a central control arm body operable to rotate around a central axis of rotation and to translate a force applied through an attached first operating cable into rotational force about the central axis of rotation;

a cable interface feature, wherein the cable interface feature is attached to a side of the central control arm body and extends outward from the center of the central control arm body, and wherein the cable interface feature comprises a cable attachment point at an end furthest from the central control arm body, and wherein the first operating cable is attached to the cable attachment point;

one or more paddle arms, wherein each of the one or more paddle arms are hingedly connected to the central control arm body through an attachment point that allows each of the one or more paddle arms to swing in an arc substantially perpendicular to an axis of rotation of the central control arm body, and wherein each of the one or more paddle arms has a cable attachment point on an end opposite the attachment point to the central control arm body; and one or more adjustment mechanisms in a one-to-one correspondence with the one or more paddle arms, wherein each of the one or more adjustment mechanisms are aligned longitudinally along the central control arm body with each of the one or more paddle arm attachment points, and wherein each of the one or more adjustment mechanisms features a set screw threaded through the adjustment mechanism substantially perpendicular to the axis of rotation of the central control arm body, wherein a threaded end of the set screw impinges on a curved face of a paddle arm of the one or more paddle arms and is operable to limit a hinged range of motion of the respective paddle are of the one or more paddle arms.

20. The control system of claim 19, further comprising:

a swivel plate, wherein the swivel plate is connected to a base of the central control arm body at a first end of the central control arm body opposite a collar portion, and wherein the major plane of the swivel plate is substantially perpendicular to the axis of rotation of the central control arm body;

a central shaft, wherein the central shaft is attached to the central control arm body at the collar portion of the central control arm body, wherein the central shaft extends through a hole that extends along the axis or rotation of the central control arm body, out the first end of the central control arm body opposite, and through the swivel plate;

a lever arm, wherein the lever arm is attached at a second end of the central shaft opposite the swivel plate from the central control arm body; and a shaft collar, wherein a shaft collar is affixed to the central shaft between the swivel plate and the lever arm operable to keep the central control arm body from moving off the swivel plate.

* * * * *